UNITED STATES PATENT OFFICE.

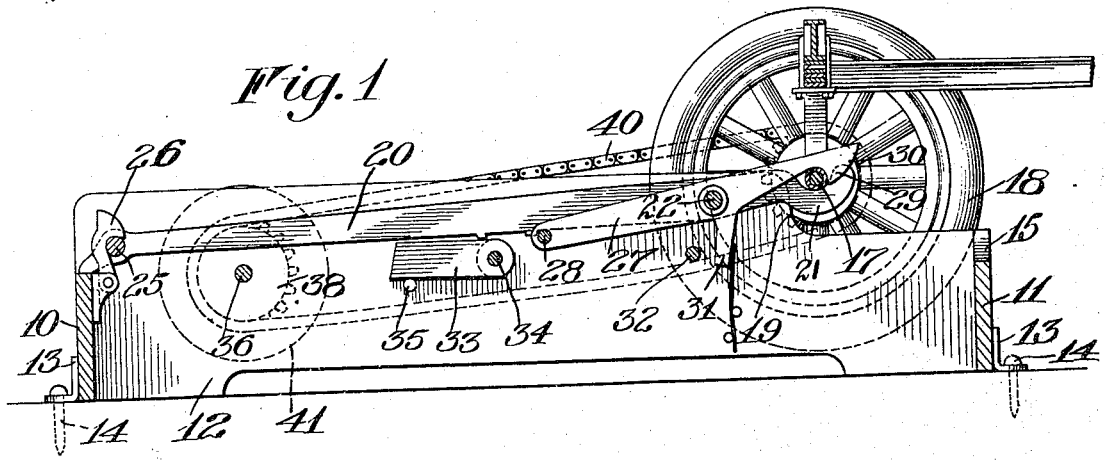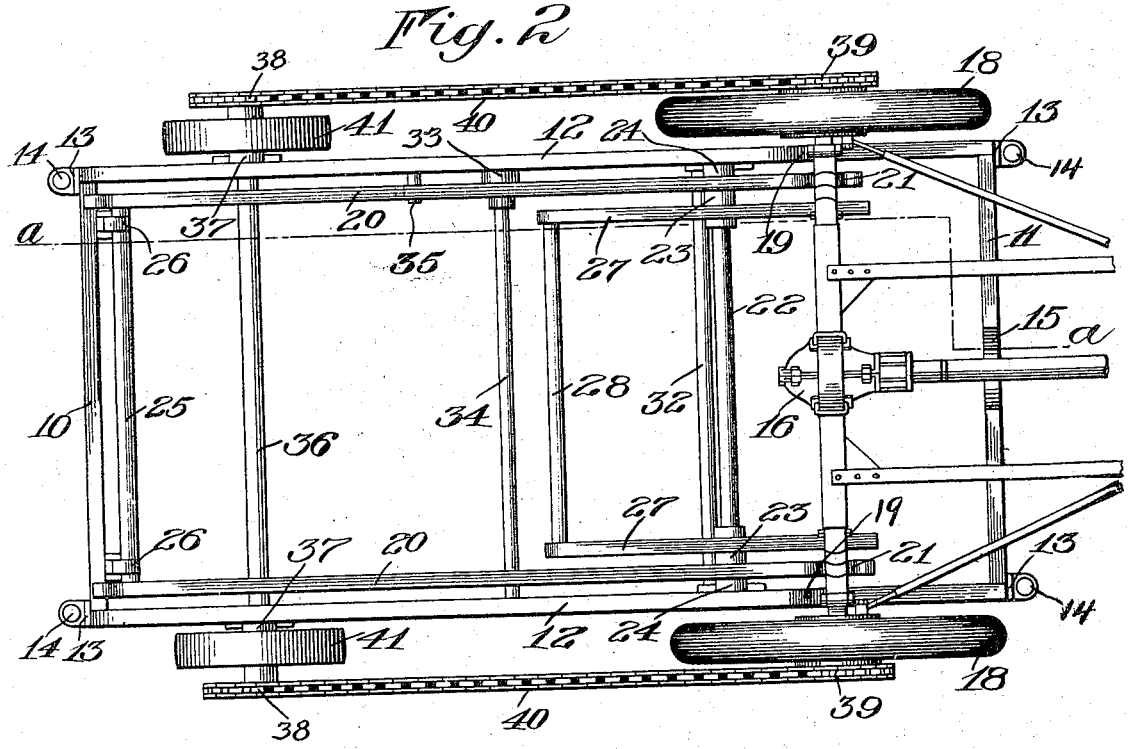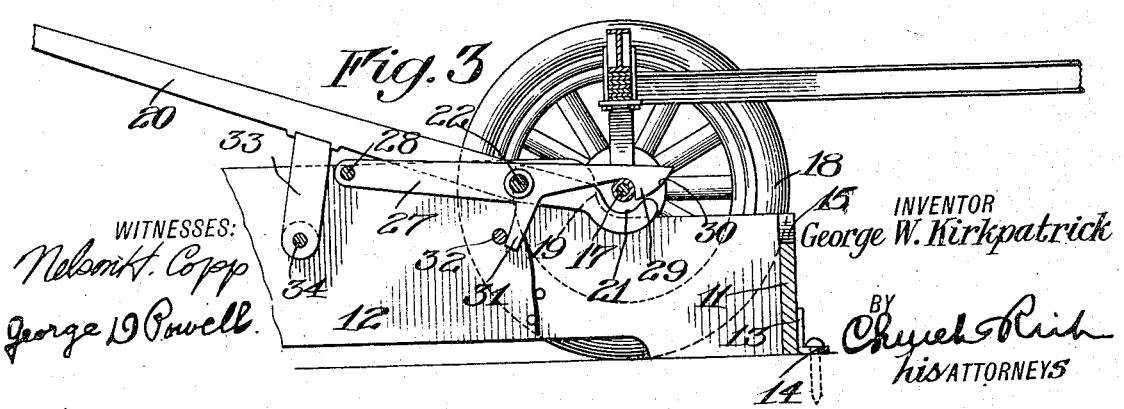

GEORGE W. KIRKPATRICK, OF ROCHESTER, NEW YORK.

POWER-TRANSMITTING AND LIFTING DEVICE.

1,279,552.  Specification of Letters Patent.  Patented Sept. 24, 1918.

Application filed March 19, 1917. Serial No. 155,644.

*To all whom it may concern:*

Be it known that I, GEORGE W. KIRKPATRICK, of Rochester, in the county of Monroe and State of New York, have invented certain new and useful Improvements in Power-Transmitting and Lifting Devices; and I do hereby declare the following to be a full, clear, and exact description of the same, reference being had to the accompanying drawings, forming a part of this specification, and to the reference characters marked thereon.

This invention relates to improvements in wheel lifting and power transmitting devices, and has for its more particular object to provide upon a relatively stationary base frame an improved arrangement of levers and latches for elevating the driving wheels of an automobile or motor driven vehicle clear of the ground and latching the driving wheel axle, to allow the engine of the stationary vehicle to be safely employed for driving a shaft upon the device which may be operatively connected with different kinds of machines.

The invention consists in certain improvements and combinations of parts as will be hereinafter more fully described; the novel features being pointed out in the claims at the end of the specification.

In the drawings:

Figure 1 is a longitudinal sectional elevation taken on line *a—a* of Fig. 2, illustrating a preferred embodiment of the invention;

Fig. 2 is a top plan view of the device in supporting position beneath and operatively connected with the driving axle and wheels of a motor driven vehicle, and Fig. 3 is an enlarged detail sectional elevation illustrating the set position of the lifting mechanism when the vehicle is moved into position to have driving wheels elevated thereby.

Similar reference characters throughout the several views indicate the same parts.

In the drawings is shown a base frame comprising the front and rear cross members 10 and 11 respectively, and the side members 12 which are suitably connected therewith, said frame being provided with the angled brackets 13 and screws or nails 14, by which it may be secured in any desired position. The rear frame member 11 is notched at 15 to clear the transmission gear casing 16 of the driving axle 17 by which the wheels 18 of the vehicle are driven. The height of the rear ends of the side frame members 12 is reduced sufficiently to clear the rear axle of the vehicle when the same is moved to the position shown in Fig. 3 and the shoulders 19 of the side members form abutments serving the purpose of bringing the vehicle to a standstill with the axle in proper position to be engaged by the inner ends of the elevating levers 20 as shown in Fig. 1, said ends being recessed or hook shaped as indicated at 21 to retain the axle thereon when the same is elevated by depressing the outer ends of said levers. A cross rod or shaft 22 extends between the side frame members 12 and upon the rod said levers are pivotally mounted, the same being preferably provided with hubs 23 rotatable upon said rod. Spacing members 24 are carried by the rod and are positioned between the side frame members and said levers are shown in Fig. 2. The outer ends of the levers 20 are connected by a hand rod 25 by which the levers are moved to the position shown in Fig. 1 where they are held by the pivotal hooks 26 mounted upon the front frame member 10.

Coöperating with the levers 20 in steadying the vehicle upon the frame are the spaced pivoted latch arms or levers 27 having hubs or bearings journaled upon the rod 22, said arms being positioned between the hubs 23 of the levers 20 as shown in Fig. 2. The outer ends of the arms 27 are connected by a hand rod 28 which serves as a means for moving said arms upon their pivot rod 22″. The axle engaging portions of the latch arms are hook shaped as indicated at 29 and coöperate with the reversely inclined hooks 21 of the levers 20 in holding and steadying the vehicle axle and driving wheels in elevated position. The hook shaped ends of the latch arms are beveled as indicated at 30 and consequently will ride over the axle housing when the vehicle is moved over the frame, the weight of the inner ends of the latch arms being sufficient to move them to the position shown in Fig. 3, after the axle has passed within the hooks 29. The axle engaging ends of the latch arms are limited in their downward movement by the projections 31 which engage the cross rod 32 between the side frame members 12. When it is desired to back the vehicle axle 17, over the frame the levers 20 are manually adjusted to the position shown in Fig. 3 and are so held temporarily by the support 33 pivoted upon the rod 34 beneath one of said levers, said support engaging the lever in a notch formed upon the lower edge thereof, as shown.

A pin 35 is projected from one of the side frame members in the path of the lever support 33 to limit its downward movement when not in use as shown in Fig. 1.

Transversely of the front end of the frame is a power transmission shaft 36 journaled in bearings 37 secured upon the side frame members 12, the ends of said shaft being projected beyond the frame to receive the sprockets 38. Sprockets 39 are suitably connected with the wheels 18 of the vehicle, and, by means of the chains 40 serve to drive the shaft 36 through the sprockets 38. Rigidly mounted upon the shaft 36 are pulleys 41 for driving belts (not shown) which may be used to operate various types of work performing machines.

It will be understood that the device may be used if desired as a convenient means for lifting the wheels and axles of vehicles independently of the power transmitting feature of the invention.

There may be either one or two axle and wheel lifting levers, such at 20, and one or two coacting latches, such as 27, locking and steadying the raised vehicle axle 17 and driving wheels 18, while the power transmitting shaft 36 is driven indirectly from the axle or directly from the wheels 18 through suitable friction gearing, but the use of two levers and latches is preferred in practice.

I claim as my invention:

1. In a wheel lifting and power transmitting device, the combination of a supporting frame, a lever pivoted on the frame and adapted to lift and support the axle of a vehicle, and a latch pivoted on the frame adapted to automatically engage the axle and coöperate with the lever to retain the axle thereon.

2. A wheel lifting and power transmitting device comprising a supporting frame, a power transmitting shaft thereon, a lever fulcrumed on the frame and adapted to lift and support the axle and driving wheels of a motor vehicle, means adapted to rotate the power transmitting shaft from the axle, and a gravitating latch on the frame coacting with the lever to automatically engage and lock and steady the raised vehicle axle and wheels while the power transmitting shaft is being operated.

3. In a wheel lifting and power transmitting device, the combination of a supporting frame, a lever pivoted on the frame and adapted to lift and support the axle of a vehicle, means for holding the lever in position to receive the axle, and a hook pivoted on the frame and adapted to coact with the lever to hold the axle in elevated position.

4. A wheel lifting and power transmitting device comprising a supporting frame, a power transmitting shaft thereon, two levers fulcrumed on the frame and adapted to lift and support the vehicle axle and driving wheels by action upon the axle near the wheels, means rotating the power transmitting shaft from the axle, and two gravitating latches on the frame coacting with the two levers to automatically engage and lock and steady the raised vehicle axle and wheels while the power transmitting shaft is being operated.

5. A wheel lifting and power transmitting device comprising in combination a motor driven vehicle having a drive shaft and wheels thereon, a frame, a power transmitting shaft revoluble upon the frame, driving connections between said wheels and the power transmitting shaft, spaced connected levers fulcrumed on the frame and extending under the vehicle drive shaft, and latch arms pivoted upon the frame and extending above the drive shaft, said levers being movable together to elevate the drive shaft relatively to the frame and said latch arms coacting with the levers to hold the vehicle drive shaft thereon.

6. A wheel lifting and power transmitting device comprising in combination a motor driven vehicle having a drive shaft and wheels thereon, a frame, a power transmitting shaft revoluble upon the frame, driving connections between said wheels and the power transmitting shaft, levers fulcrumed on the frame and extending upon one side of the vehicle drive shaft, and latch arms pivoted upon the frame and extending upon the opposite side of said drive shaft, said levers serving to elevate the drive shaft and said latch arms coacting with the levers to steady the vehicle when its wheels are elevated.

7. A wheel lifting and power transmitting device comprising a frame having levers fulcrumed thereon arranged to extend upon one side of the driving axle of a motor driven vehicle and movable to elevate the same, a power transmitting shaft revoluble upon the frame, driving means operatively connecting said power transmitting shaft and the axle, and pivoted latch arms upon the frame adapted to automatically engage the axle and then coact with the levers to steady the axle and driving wheels when elevated by the levers.

8. A wheel lifting and power transmitting device comprising a frame having levers pivoted thereon arranged to extend under the driving axle and between the wheels of a motor driven vehicle and movable to elevate the same, a power transmitting shaft on the frame and means operatively connecting it with the vehicle axle and driving wheels, and pivoted latch arms upon the frame having hook-shaped ends coacting with the levers to steady the axle and driving wheels in elevated position upon the said levers.

9. A wheel lifting and power transmitting device comprising a frame having stop shoulders limiting advance of a motor vehicle driving axle over the frame, levers fulcrumed on the frame and adapted to lift and support the vehicle axle and driving wheels, a power transmitting shaft on the frame, means adapted to rotate the said shaft from the axle, and latches on the frame automatically engaging the axle when stopped by the frame shoulders and coacting with the levers to lock and steady the raised vehicle axle and driving wheels while the power transmitting shaft is being operated.

GEORGE W. KIRKPATRICK.